United States Patent
Korte et al.

(10) Patent No.: US 9,233,587 B2
(45) Date of Patent: Jan. 12, 2016

(54) TRANSVERSE CONTROL ARM, AND METHOD FOR PRODUCING A TRANSVERSE CONTROL ARM

(71) Applicant: Benteler Automobiltechnik GmbH, Paderborn (DE)

(72) Inventors: Frederic Korte, Paderborn (DE); Stephan Meyer, Bielefeld (DE); Volker Rackow, Paderborn (DE); Daniel Rieskamp, Ibbenbüren (DE)

(73) Assignee: BENTELER AUTOMOBIL TECHNIK GMBH, Paderborn (DE)

( * ) Notice: Subject to any disclaimer, the term of this patent is extended or adjusted under 35 U.S.C. 154(b) by 0 days.

(21) Appl. No.: 13/910,441

(22) Filed: Jun. 5, 2013

(65) Prior Publication Data
US 2013/0328283 A1 Dec. 12, 2013

(30) Foreign Application Priority Data

Jun. 6, 2012 (DE) .......................... 10 2012 104 909

(51) Int. Cl.
*B60G 7/00* (2006.01)
*B21D 53/90* (2006.01)
*F16C 7/08* (2006.01)
*F16C 7/02* (2006.01)

(52) U.S. Cl.
CPC .............. *B60G 7/001* (2013.01); *B21D 53/90* (2013.01); *F16C 7/08* (2013.01); *B60G 2206/11* (2013.01); *B60G 2206/722* (2013.01); *B60G 2206/8103* (2013.01); *F16C 7/02* (2013.01); *F16C 2326/05* (2013.01); *Y10T 29/49622* (2015.01)

(58) Field of Classification Search
CPC ................................. B60G 7/001; B60G 3/06
USPC ...................... 280/124.134; 29/897.2; 72/254
See application file for complete search history.

(56) References Cited

U.S. PATENT DOCUMENTS

| 1,445,850 | A | * | 2/1923 | Schaefer ..................... 74/579 R |
| 4,473,241 | A | * | 9/1984 | von der Ohe et al. ......... 280/781 |
| 5,163,603 | A | * | 11/1992 | Richart ....................... 228/141.1 |
| 5,845,938 | A | * | 12/1998 | Kato ............................. 280/784 |
| 5,992,867 | A | * | 11/1999 | Kato et al. ............. 280/124.134 |

(Continued)

FOREIGN PATENT DOCUMENTS

| CN | 102069692 A | 5/2011 |
| DE | 299 23 883 | 5/2001 |

(Continued)

OTHER PUBLICATIONS

Tsuboi, Takahiko, JP 08-233009, Sep. 10, 1996, English Machine Translation.*

(Continued)

*Primary Examiner* — Karen Beck
(74) *Attorney, Agent, or Firm* — Henry M. Feiereisen LLC

(57) ABSTRACT

A transverse control arm for installation in a motor vehicle is being configured as a single-piece malleable structure of uniform material and includes two bearing mounts for receiving elastic bearings and an arcuate center portion which extends between the bearing mounts and has a hollow cross section. The center portion includes in cross section a web and side panels respectively extending from the web in spaced-apart confronting relationship, in particular in parallel relationship.

18 Claims, 4 Drawing Sheets

(56) References Cited

U.S. PATENT DOCUMENTS

| | | | |
|---|---|---|---|
| 6,070,445 A * | 6/2000 | Holierhoek | 72/61 |
| 6,122,948 A * | 9/2000 | Moses | 72/61 |
| 6,810,586 B1 * | 11/2004 | Waaler et al. | 29/897.2 |
| 7,261,307 B2 * | 8/2007 | Nuno et al. | 280/124.151 |
| 7,273,219 B2 * | 9/2007 | Michel et al. | 280/124.134 |
| 7,503,417 B2 * | 3/2009 | Lichtinger et al. | 180/273 |
| 7,506,444 B2 * | 3/2009 | Weise | 29/897.2 |
| 7,850,182 B2 * | 12/2010 | Jang et al. | 280/124.134 |
| 7,997,599 B2 * | 8/2011 | Zmyslowski et al. | 280/124.134 |
| 8,100,423 B2 * | 1/2012 | Kruse et al. | 280/124.134 |
| 8,167,325 B2 * | 5/2012 | Lee et al. | 280/124.134 |
| 8,251,386 B2 * | 8/2012 | Chiku et al. | 280/124.134 |
| 8,291,595 B2 | 10/2012 | Runte et al. | |
| 8,388,000 B2 * | 3/2013 | Hessing et al. | 280/124.134 |
| 8,398,102 B2 * | 3/2013 | Monchiero et al. | 280/124.134 |
| 8,459,674 B2 * | 6/2013 | Mielke et al. | 280/124.134 |
| 8,616,570 B2 * | 12/2013 | Mielke et al. | 280/124.134 |
| 8,678,409 B2 * | 3/2014 | Koide et al. | 280/124.135 |
| 2004/0135337 A1 * | 7/2004 | Alesso et al. | 280/124.134 |
| 2006/0017253 A1 * | 1/2006 | Kye | B60G 21/055 280/124.107 |
| 2007/0040345 A1 * | 2/2007 | Hardtke et al. | 280/124.164 |
| 2009/0072506 A1 * | 3/2009 | Jang et al. | 280/124.134 |
| 2010/0084834 A1 * | 4/2010 | Ersoy et al. | 280/124.1 |
| 2011/0115183 A1 * | 5/2011 | Alesso | B60G 21/051 280/124.106 |
| 2011/0115186 A1 * | 5/2011 | Chiku et al. | 280/124.134 |
| 2011/0127743 A1 * | 6/2011 | Musha | 280/124.1 |
| 2011/0198821 A1 * | 8/2011 | Hessing et al. | 280/124.134 |
| 2011/0210528 A1 * | 9/2011 | Haas | B60G 7/001 280/124.128 |
| 2012/0299263 A1 * | 11/2012 | Mielke et al. | 280/124.134 |
| 2015/0130159 A1 * | 5/2015 | Nakasato | B60G 7/001 280/124.134 |

FOREIGN PATENT DOCUMENTS

| | | |
|---|---|---|
| DE | 102004003150 | 8/2005 |
| DE | 103 34 192 | 9/2005 |
| DE | 102006028713 | 11/2007 |
| DE | 102006051609 | 5/2008 |
| DE | 10 2008 015 393 | 9/2009 |
| DE | 10 2008 015393 A1 | 9/2009 |
| DE | 102009008842 | 8/2010 |
| DE | 10 2010 007 946 | 8/2011 |
| DE | 102010006284 | 8/2011 |
| DE | 4102010010665 A1 | 9/2011 |
| DE | 102010051741 | 5/2012 |
| EP | 1 215 068 | 6/2002 |
| EP | 2000 335 A2 | 12/2008 |
| EP | 2 241 459 | 10/2010 |
| EP | 2 266 821 A1 | 12/2010 |
| EP | 2 455 244 A1 | 5/2012 |
| EP | 2 524825 A2 | 11/2012 |
| JP | H 08-233009 | 9/1996 |
| JP | 2010-126095 | 6/2010 |

OTHER PUBLICATIONS

Chinese Search Report with respect to counterpart Chinese patent application 2013102201161.

Translation of Chinese Search Report with respect to counterpart Chinese patent application 2013102201161.

* cited by examiner

TRANSVERSE CONTROL ARM, AND METHOD FOR PRODUCING A TRANSVERSE CONTROL ARM

CROSS-REFERENCES TO RELATED APPLICATIONS

This application claims the priority of German Patent Application, Serial No. 10 2012 104 909.2, filed Jun. 6, 2012, pursuant to 35 U.S.C. 119(a)-(d), the content of which is incorporated herein by reference in its entirety as if fully set forth herein.

BACKGROUND OF THE INVENTION

The present invention relates to a transverse control arm for installation in a motor vehicle, and to a method for manufacturing a transverse control arm.

The following discussion of related art is provided to assist the reader in understanding the advantages of the invention, and is not to be construed as an admission that this related art is prior art to this invention.

Transverse control arms are normally installed in wheel suspensions of motor vehicles in order to support a wheel carrier relative to the motor vehicle body. Control arms come in various designs and can be manufactured as cast structures or welded structures or also as sheet-metal structures. Motor vehicle manufacturers tend to use lightest possible components on the side of unsprung wheel masses in order to positively affect driving-dynamics properties of a motor vehicle. Common to all conventional transverse control arms is their relatively substantial weight and a complex manufacturing process.

It would therefore be desirable and advantageous to provide an improved transverse control arm which obviates prior art shortcomings and which can be manufactured very precisely with superior strength properties while yet being of lightweight structure.

SUMMARY OF THE INVENTION

According to one aspect of the present invention, a transverse control arm for installation in a motor vehicle is being configured as a single-piece malleable structure of uniform material and includes two bearing mounts, elastic bearings received in the bearing mounts, and an arcuate center portion extending between the bearing mounts and having a hollow cross section.

A transverse control arm according to the present invention can be made as a sheet-metal part or be made of steel sheet. The provision of the arcuate center portion enables the transverse control arm to maintain a highly complex geometry for guidance of shock absorbers, suspension rods or similar components and yet can at the same time be produced in a forming process in an especially cost-effective manner and is lightweight as a result of a hollow configuration of the center portion. As the arcuate center portion is hollow in cross section, a transverse control arm according to the present invention has a particularly high stiffness despite its slight weight and even though it is easy to produce.

As the transverse control arm involves a hollow member, material can be saved so that the need for raw material is greatly reduced compared to control arms that have been punched out of a massive metal sheet or cast from a material. There is no need for a transverse control arm of the present invention to undergo complicated mechanical finishing processes, in particular machining operations so that costs for manufacturing a transverse control arm according to the invention can be decreased as less raw material is used and finishing operations are saved.

At the same time, it is possible to produce a transverse control arm according to the invention in such a way that the forming operation also involves a calibration of the bearing mounts which are advantageously provided in an end region of the transverse control arm. As a result, a single forming operation in a forming tool is only needed for manufacturing the transverse control arm according to the invention by forming a blank into the transverse control arm which is provided with bearing mounts of highest precision in relation to one another. Overall, a transverse control arm according to the invention is superior to conventional transverse control arms as a result of material savings, lesser weight, easier manufacture, and high stiffness.

According to another advantageous feature of the present invention, the center portion can be configured as a hollow section with closed cross section or as a hollow section with open cross section. It is possible within the scope of the invention to form a transverse control arm in a forming operation in such a way that two formed ends formfittingly abut each other in the center portion. Subsequently or during the forming operation, the center portion can be coupled together, for example by welding, or soldering, or bonding, so as to provide a hollow profile that is closed in cross section. As an alternative, when the center portion is open in cross section, the bent ends of the center portion may formfittingly abut one another in the absence of any further joining operation so that such a configuration is considered as an open hollow profile within the scope of the invention. Currently preferred is however to space the two bent ends of the center portion at a distance so as to render the center portion hollow in cross section which is open on one side. This hollow profile of the center portion may advantageously have a U-shaped cross section. Currently preferred is a C-shaped configuration.

According to another advantageous feature of the present invention, the bearings may be configured as rubber bearings. Advantageously, these rubber bearings are fitted in the transverse control arm. Examples of rubber bearings include plastic bearings or elastomer bearings, which may be formed also of caoutchouc or other rubber-like and/or elastic material. Advantageously, the rubber bearings are press-fitted in the bearing mounts of the transverse control arm. Currently preferred is the use of rubber-metal bearings. The bearing may hereby be bordered as a rubber-metal bearing by a sleeve-like eyelet which surrounds the bearing on the outside, with the eyelet being press-fitted in the bearing mounts. It is, of course, also conceivable to couple the rubber bearing in the bearing mounts by a material joint, for example by bonding or by vulcanization. Advantageously, the bearings are directly placed or press-fitted in the bearing mounts so that there is no need for additional parts for forming or arranging the bearing mount or the mounting eyes on the transverse control arm. This also decreases costs of the ready-to-install transverse control arm with incorporated bearings.

According to another advantageous feature of the present invention, the center portion can include in cross section a web and side panels extending from the web, advantageously in spaced-apart confronting relationship. In this way, the center portion is configured such that a web is first defined in a blank and the side panels are bent from this web so as to extend from the web. The side panels extend in spaced-apart confronting relationship. Currently preferred is a configuration of the side panels in confronting parallel relationship. Compared to the web, the side panels are configured advantageously as least twice as long or suitably three times as long.

As a result, a transverse control arm according to the present invention has a particularly high bending resistance over the length of the side panels in force direction within a plane in which the side panels lie.

According to another advantageous feature of the present invention, the side panels have ends disposed in opposing relationship to the web and having at least one region provided with a reinforcing edge, with the reinforcing edge of one of the opposing ends and the reinforcing edge of the other one of the opposing ends preferably oriented in a direction towards one another. The presence of the reinforcing edges compensates any force impacts substantially orthogonal to the plane in which also the side panels extend and increases durability.

As the reinforcing edges extend at an angle in relation to the side panels, a force that is introduced into the transverse control arm within the plane of the side panel does not cause an increase in stress at one end of the side panel so that no stress fractures or micro-cracks are encountered when the transverse control arm operates over an extended period.

As a result of reinforcing edges which are oriented towards one another at the end of the side panels, the center portion has a substantial C-shaped configuration in cross section.

According to another advantageous feature of the present invention, each of the bearing mounts can be configured in the form of two mounting eyes, preferably circular mounting eyes, preferably in parallel relationship. As a result, each mounting eye lies in one end or along or in prolongation of the side panel so that advantageously the two side panels in spaced-apart confronting parallel relationship have ends, each provided with a mounting eye.

According to another advantageous feature of the present invention, the mounting eyes can each have a through-passage formed with a collar. Advantageously, the collar of one mounting eye and the collar of the other one of the mounting eyes can be oriented in a same direction or in opposite direction. When the collars of the through-passages are oriented in opposite direction, the collars may be arranged pointing towards one another or away from one another. Depending on the type of bearing, it is thus possible to provide optimal support, especially when considering placement, for example through press-fitting or securement of the bearing in the transverse control arm. The collar may also be configured of such a length that the bearing is secured to the collar by a material joint.

According to another advantageous feature of the present invention, at least one of the mounting eyes can have an opening plane oriented in a plane with the side panels. Advantageously, the opening plane lies in a plane with the side panel. In this way, forming operations are minimized during the forming operation so that the bent side panels can be configured flatly in such a way that a mounting eye lies at their respective ends in a side panel plane.

According to another advantageous feature of the present invention, the web of the center portion can have a recessed zone to define a valley having a low point lying below a straight line between a center point of one of the bearing mounts and a center point of the other one of the bearing mounts, preferably below a straight line extending through outer edges of the bearing mounts in a direction of the recessed zone. The arcuate profile can be best suited to the application at hand with respect to demands and loads on the transverse control arm. Ideally, the arcuate profile can be described by a radius which spans the arc in the area of the center portion in the form of a substantial semi-circle and which increases towards the mounting eyes. Advantageously, the radius is only few millimeters but may also amount to several hundred millimeters. The radii may range from 10 to 250 mm, preferably 20 to 200 mm, or even 30 to 150 mm. Currently preferred are radii in the range of 40 to 120 mm. It is also conceivable to further narrow the range by which the radius is defined. Examples of ranges include radii between 45 to 110 mm, 50 to 100 mm, or 60 to 90 mm. In addition, the arcuate profile in the area of the center portion may include a straight or linear section. The valley is defined in particular by the web of the transverse control arm, with the lowest point of the valley lying below a straight line between a center point of one of the bearing mounts and a center point of the other one of the bearing mounts. The transverse control arm has thus a hook-shaped or crescent-shaped profile, with the arcuate section deviating from the straight line, when the two bearing mounts are connected by a straight line. Advantageously, the lowest point of the arcuate section, i.e. the lowest point of the valley is spaced from the straight line at a vertical distance which suitably is dependent from the ratio to the horizontal distance of both center points of the two mounting eyes. The ratio of the vertical distance to the horizontal distance may range from 1:4 to 1:8, preferably between 1:5 and 1:7. Currently preferred is a ratio of 1:6. Advantageously, a straight line is defined in arc direction below the mounting eyes, with the deepest point of the valley arranged below this straight line. As a result, it is possible to produce a transverse control arm of highly complex configuration in a simple manner.

According to another advantageous feature of the present invention, the single-piece malleable structure may be produced from a metal sheet which may be made of a steel alloy or a light metal alloy, such as aluminum alloy. Advantageously, the transverse control arm can be made from a metal sheet of hardenable steel alloy or a steel alloy having strength properties which can be adjusted by a hot-forming and press-hardening process.

According to another advantageous feature of the present invention, the transverse control arm can have a wall thickness which varies at least in part. As a result, weight and material use can be optimized. Advantageously, the wall thickness of the transverse control arm varies in its longitudinal direction or also in transverse direction, i.e. in axial direction and also radial direction. It is thus possible to provide the transverse control arm with reduced wall thickness in those regions that are less subject to stress so that weight and material can be saved, whereas regions that are subject to greater stress can be made of greater wall thickness so that the transverse control arm can meet the required strength specifications. It is further conceivable, within the scope of the invention, to provide the wall thickness of the metal sheets in a range between 0.5 and 5 mm, preferably between 1 and 4.5 mm. Currently preferred is a range between 1.5 and 4 mm. It is also conceivable to limit the metal sheet thickness to a range between 2 and 3 mm. For that purpose, a transverse control arm can be manufactured from a partially rolled blank, also called tailor rolled blank, or from a blank with homogenous wall thickness which is then stretched in such a way as to establish zones with varying wall thicknesses.

According to another advantageous feature of the present invention, the center portion may have recesses and/or openings. Currently preferred is the provision of recesses and/or reinforcing geometries, preferably in the form of embossments, in the side panels. As a result, stiffness properties in longitudinal and transverse directions of a control arm according to the invention are further enhanced. It is also conceivable to provide the center portion, in particular in the transition from the center portion to the bearing mount, with relief profiles to potentially deflect local stress peaks within the structure.

According to another aspect of the present invention, a method of manufacturing a transverse control arm includes placing a blank into a forming tool, forming a web in longitudinal direction of the blank with an arcuate profile in orthogonal relationship to a plane of the blank, bending the web to form side panels, perforating the blank to provide holes for bearing mounts, and forming through-passages in the holes.

As described above, the blank may be placed into the forming tool as a partly rolled blank or locally stretched in the forming tool to establish various wall thicknesses in the structure.

The afore-described method steps can be exchanged, if desired, so that the blank is initially perforated to provide the holes before the perforated blank is then placed into the forming tool. It is also conceivable, to perforate the blank in the forming tool or to provide the holes after removal of the pre-formed control arm blank in a separate perforation step. Currently preferred, however, is a perforation while the blank is in the forming tool, and subsequently through-passages are formed again while the blank is in the forming tool. Press-hardening may be executed thereafter so that the forming operation can be carried out while the material is still relatively soft before undergoing a homogenous hardening process. It is advantageous, to provide the holes in the transverse control arm directly during the forming process and subsequently to provide the through-passages because the structure can then be calibrated at the same time and after removal is very precise as far as a relative distance of the bearing mounts as well as absolute distances of the bearing mounts are concerned.

The complexity of the manufacturing process involves the formation of an arcuate shape of the control arm, with the web in particular being shaped to receive the arcuate profile, with the arcuate profile extending in orthogonal relationship to the original blank plane. Then, the side panels are formed by bending the web so as to exhibit an arcuate profile as well, with the arcuate profile extending about an axis which lies orthogonally in relation to the side panel plane in end position. In particular, the option to produce the transverse control arm with varying wall thicknesses enables through localized stretching a manufacture of the transverse control arm as single-piece or one-part structure of especially uniform material by a single forming operation, without reducing strength properties of the structure. Especially, the formation of reinforcing edges enables the exposed ends of the side panels, i.e. the ends in opposition to the web, to be relieved from stress peaks to prevent the occurrence of micro-cracks or fatigue cracks.

According to another advantageous feature of the present invention, the transverse control arm can be manufactured as hot-formed and press-hardened part. In this way, the transverse control arm receives high-strength or even super high-strength properties. It is hereby possible to, at least in part, heat the blank, while being cut to size or shortly thereafter, to a temperature above austenitizing temperature so as to hot-form and then to press-harden the blank in the forming tool through quenching.

As an alternative, a transverse control arm may also be manufactured as fiber composite part. This can be realized by providing a fiber composite mat with matrix resin and then forming it at least as a single-layer fiber composite mat in a manner as described above to a metallic transverse control arm according to the invention. A transverse control arm which is made from fiber composite may optionally be laminated with at least one bearing eyelet in the area of the bearing mounts, with the bearing eyelet preferably made of metal.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1b is a schematic illustration of the transverse control arm of FIG. 1a;

FIGS. 2a1 to 2f are schematic illustrations of various manufacturing steps to make a transverse control arm according to the present invention;

FIG. 3a is an enlarged detailed view taken along the line I-I in FIG. 1a; and

FIG. 3b is an enlarged detailed view taken along the line II-II in FIG. 1a.

DETAILED DESCRIPTION OF PREFERRED EMBODIMENTS

Figure 1A:
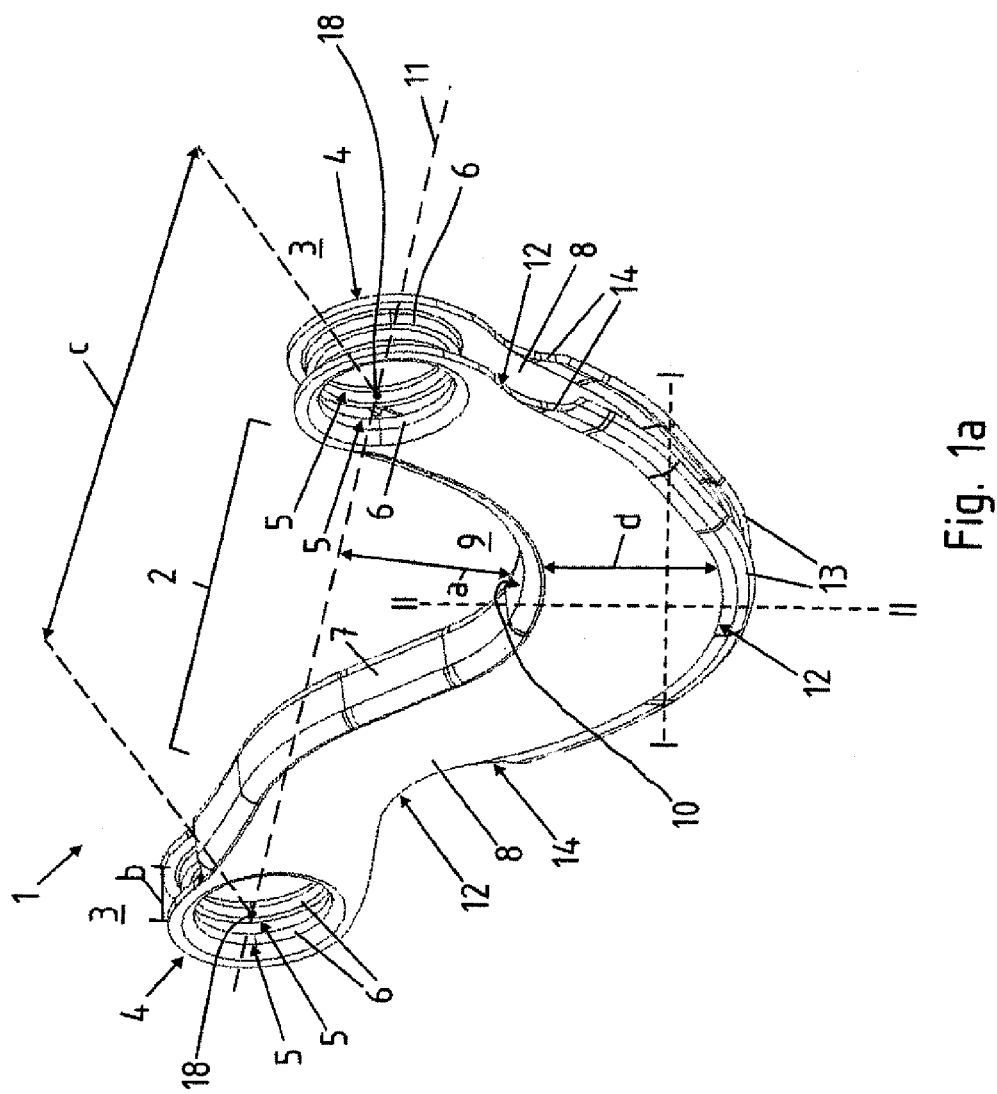
FIG. 1a is a perspective illustration of a transverse control arm according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1a, there is shown a perspective illustration of a transverse control arm according to the present invention, generally designated by reference numeral 1 and including a center portion 2 having an arcuate profile. Arranged at each of the ends 3 of the transverse control arm 1 is a bearing mount 4. In the non-limiting example shown in FIG. 1a, the bearing mount 4 includes two mounting eyes 5 in confronting relationship. The mounting eyes 5 are configured to include a through-passage formed in particular by a collar 6. The collar 6, in turn, is arranged in both bearing mounts 4 in such a way that two confronting collars 6 are oriented in a direction pointing to one another. The center points 18 of the bearing mounts 4 are spaced by a distance c from one another. The distance c may range between 200 to 500 mm, preferably 300 to 400 mm. Currently preferred is a distance c between 325 to 400 mm.

The center portion 2 includes a web 7 and side panels 8 extending from each side of the web 7. The side panels 8 and the web 7 of the center portion 2 have an arcuate or semicircular profile which changes in a direction towards the bearing mounts 4. In the area of the center portion 2, the arcuate or semicircular profile is defined by a radius r1 which expands towards the bearing mounts 4, as indicated by radius r2, shown in FIG. 1b. Moreover, the side panel 8 has a height d, ranging between 50 to 90 mm, preferably between 55 to 80 mm, especially preferred between 60 to 75 mm. Currently preferred is a range for the height d between 65 to 70 mm. The web 7 is formed with a recessed section to define a valley 9 having a deepest point 10. The deepest point 10 of the valley 9 is spaced from a straight line 11 connecting the two center points 18 of the mounting eyes 5 by a distance which corresponds in the valley 9 to the radius r1 of the arcuate profile. The side panels 8 have ends 12 disposed in opposition to the web 7 and bent to respectively form a reinforcing edge 13, with the reinforcing edges 13 of the ends 12 oriented to point to each other in the non-limiting example, as shown here. The reinforcing edges 13 connect in the form of an arc in a transition zone 14 into the free ends 12 of the side panels so as to establish an optimum stress conduction within the structure. The mounting eyes 5 are spaced from one another on the left-hand side of FIG. 1a by a distance b. The same applies for the side panels 8. The distance b may range between 15 to 30 mm, preferably 19 to 27 mm, especially preferred between 21 to 25 mm. Currently preferred is a distance b of 23 mm.

Figure 1B:
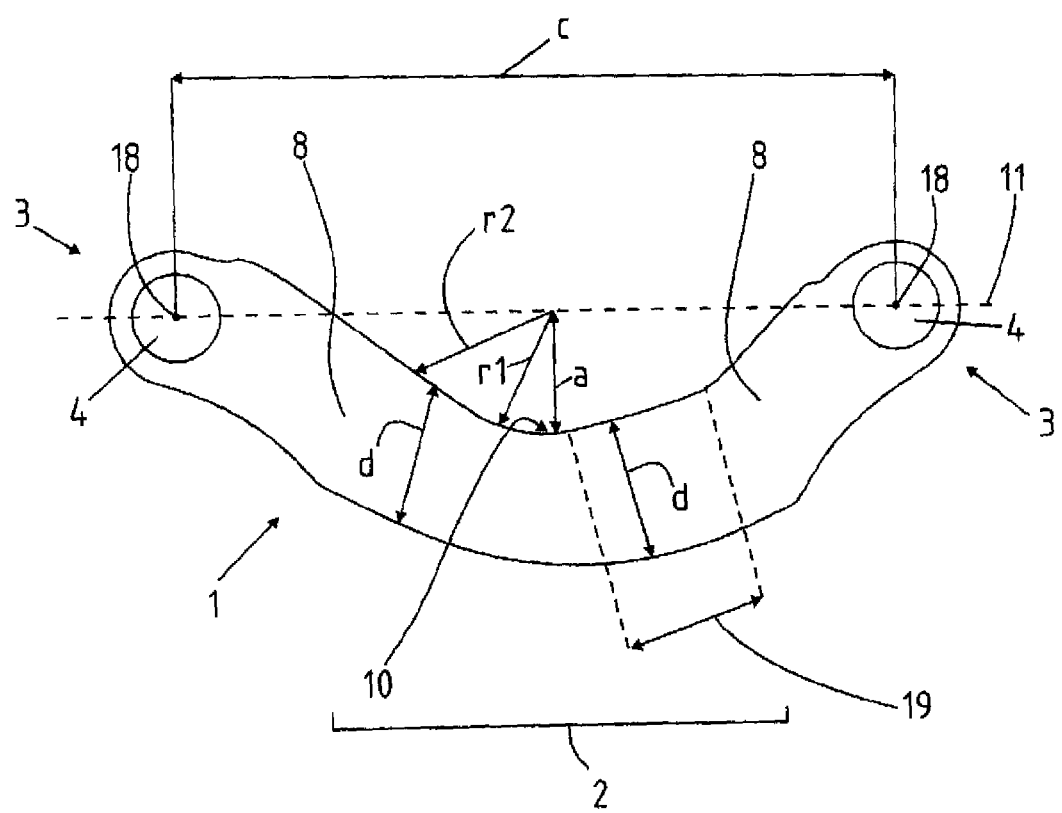

FIG. 1b further shows an elevational view of the transverse control arm 1. The center points 18 of the bearing mounts 4, provided at the ends 3 of the transverse control arm 1 are spaced from one another by a horizontal distance c. In the valley 9 at its deepest point 10, the center portion 2 has a distance a to the straight line 11 connecting the center points 18. The distance a is dependent on the distance c between the two center points 18 of the bearing mounts 4. During realization of the transverse control arm 1, ratios between the distances a and c of 1:4 to 1:8, preferably 1:5 to 1:7, and in particular a ratio of 1:6 have proven beneficial.

In addition, the distance a in the valley 9 substantially corresponds to the semicircular radius r1. This radius r1 increases towards the ends 3 of the transverse control arm 1 to a radius r2. Further shown is a substantially straight section 19 which is also located in the center portion 2 of the transverse control arm 1.

Figure 2:
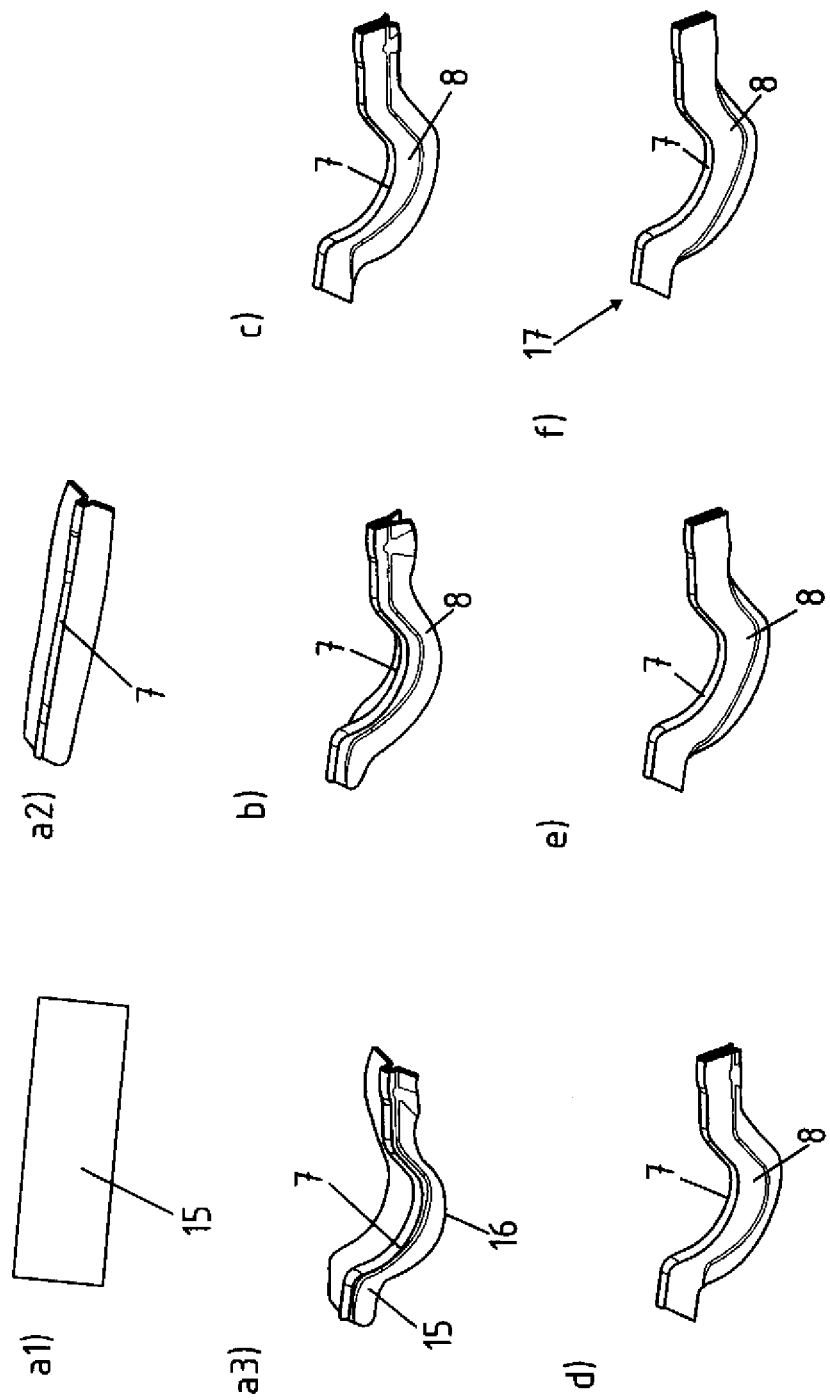
Figure 3:
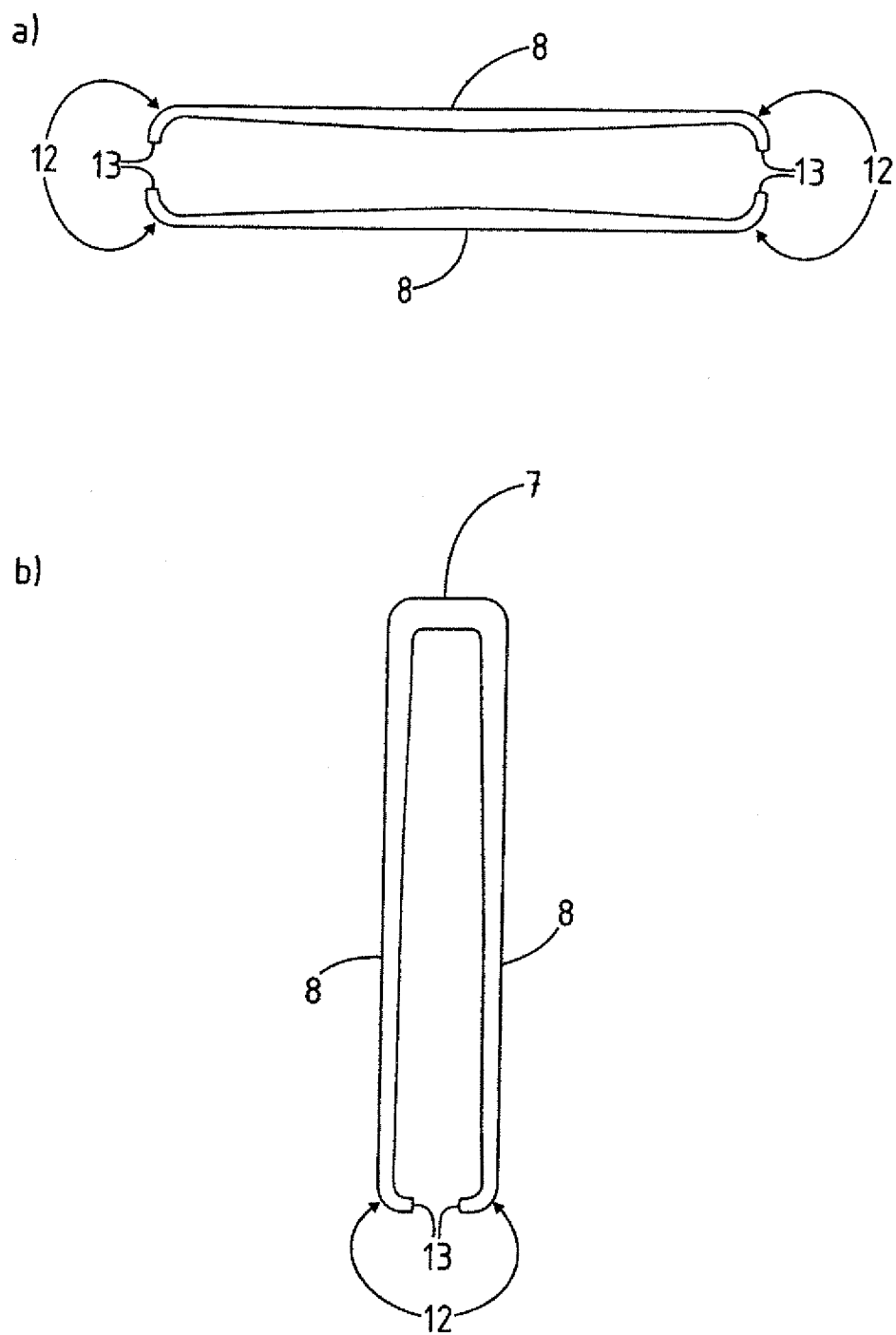

FIGS. 2a1 to 2f show the method steps to manufacture the transverse control arm according to the invention. FIG. 2a1 shows a planar blank 15 provided for the process and placed into a forming tool. In a first forming step, a web 7 is formed onto the blank 15 to divide the blank 15 in substantially two identically sized portions, as shown in FIG. 2a2. Thereafter, in a second step, the blank 15 is formed close to its final contour. This results in arcuately configured sections 16 of the blank 15, as shown in FIG. 2a3. In a next forming step, as shown in FIG. 2b, the arcuate sections 16 are bent to produce side panels 8 in which bearing mounts 4 are integrated in a later step which is not shown in detail.

According to FIGS. 2c to 2f, the side panels 8 are bent in such a way to produce a transverse control arm blank 17, as shown in FIG. 2f. Subsequent forming and processing operations provide the transverse control arm blank 17 for example with holes or involve a trimming of its edges or a tempering and quenching process. With a method according to the present invention, it is further possible to implement all forming steps, shown in FIGS. 2a1 to 2f, within a forming process in a single forming tool, including even perforation of the mounting eyes.

FIGS. 3a and 3b are schematic views taken along the lines I-I and II-II, respectively, to show that the transverse control in the form of a single-piece malleable structure has a wall thickness which varies at least in part at least in one direction selected from the group consisting of axial direction and radial direction.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A transverse control arm for installation in a motor vehicle, said transverse control arm being configured as a single-piece malleable sheet metal part of uniform material and comprising:
    a maximum of two bearing mounts spaced apart along a longitudinal extent of the transverse control arm;
    elastic bearings received in the bearing mounts, respectively; and
    an arcuate center portion extending between the bearing mounts, said center portion including a web which in a longitudinal cross section has an arcuate configuration along a longitudinal extent to thereby form the center portion with an open hollow cross section, said web.

2. The transverse control arm of claim 1, wherein the bearings are rubber bearings or rubber-metal bearings.

3. The transverse control arm of claim 1, wherein the side panels extend from the web in parallel spaced-apart confronting relationship.

4. The transverse control arm of claim 3, wherein the side panels have ends disposed in opposing relationship to the web and having at least one region provided with a reinforcing edge, with the reinforcing edge of one of the opposing ends and the reinforcing end of the other one of the opposing ends preferably oriented in a direction towards one another.

5. The transverse control arm of claim 1, wherein each of the bearing mounts is configured in the form of a mounting eye.

6. The transverse control arm of claim 1, wherein each of the bearing mounts is configured in the form of two mounting eyes in parallel relationship.

7. The transverse control arm of claim 5, wherein the mounting eye includes a through-passage formed with a collar.

8. The transverse control arm of claim 6, wherein the mounting eyes have each a through-passage formed with a collar, with the collar of one of the mounting eyes and the collar of the other one of the mounting eyes oriented in a same direction or in opposite direction.

9. The transverse control arm of claim 5, wherein the mounting eye has an opening plane oriented in a plane with the side panels.

10. The transverse control arm of claim 1, wherein the center portion has a recessed zone to define a valley having a low point lying below the bearing mounts.

11. The transverse control arm of claim 1, wherein the single-piece malleable structure is a steel member.

12. The transverse control arm of claim 1, wherein the single-piece malleable structure has a wall thickness which varies at least in part at least in one direction selected from the group consisting of axial direction and radial direction.

13. The transverse control arm of claim 4, wherein the side panels of the center portion have at least one of recesses, openings, and reinforcing geometries.

14. The transverse control arm of claim 1, wherein the bearings are press-fitted in the bearing mounts.

15. The transverse control arm of claim 1, wherein each of the bearing mounts is configured in the form of a circular mounting eye.

16. The transverse control arm of claim 11, wherein the steel member is a hot-formed and press-hardened part.

17. The transverse control arm of claim 11, wherein the single-piece malleable structure is a light metal member.

18. The transverse control arm of claim 4, wherein the side panels of the center portion have embossments.

* * * * *